(12) United States Patent
Van Den Elshout et al.

(10) Patent No.: US 10,285,426 B2
(45) Date of Patent: May 14, 2019

(54) SALT REPLACEMENT COMPOSITION, A PROCESS FOR MAKING A SALT REPLACEMENT COMPOSITION, AND ITS USE IN BAKED DOUGH PRODUCTS

(71) Applicants: SCELTA UMAMI HOLDING B.V., Belfeld (NL); Wilhelmus Hubertus Henricus Antonius Van Den Elshout, Venlo (NL); Johannes Gisbert Gerardus Maria Klerken, Jr., Venlo (NL)

(72) Inventors: Wilhelmus Hubertus Henricus Antonius Van Den Elshout, Venlo (NL); Johannes Gisbert Gerardus Maria Klerken, Jr., Venlo (NL)

(73) Assignee: Scelta Umami Holding B.V., Belfeld (NL)

( * ) Notice: Subject to any disclaimer, the term of this patent is extended or adjusted under 35 U.S.C. 154(b) by 606 days.

(21) Appl. No.: 14/400,336

(22) PCT Filed: May 13, 2013

(86) PCT No.: PCT/EP2013/059792
§ 371 (c)(1),
(2) Date: Nov. 11, 2014

(87) PCT Pub. No.: WO2013/167749
PCT Pub. Date: Nov. 14, 2013

(65) Prior Publication Data
US 2015/0296849 A1    Oct. 22, 2015

(30) Foreign Application Priority Data
May 11, 2012 (NL) ........................ 2008798

(51) Int. Cl.
*A21D 2/02* (2006.01)
*A21D 2/36* (2006.01)
*A23L 27/40* (2016.01)

(52) U.S. Cl.
CPC ............... *A23L 27/45* (2016.08); *A21D 2/02* (2013.01); *A21D 2/36* (2013.01); *A23V 2002/00* (2013.01)

(58) Field of Classification Search
CPC ............................. A23L 1/2375; A21D 2/36
USPC .......................................................... 428/62
See application file for complete search history.

(56) References Cited

U.S. PATENT DOCUMENTS

| | | | |
|---|---|---|---|
| 3,821,436 A * | 6/1974 | Fry | ........................ A23G 3/346 426/470 |
| 4,107,346 A | 8/1978 | Kravitz | |
| 4,297,375 A | 10/1981 | Shackelford | |
| 4,963,387 A * | 10/1990 | Nakagawa | .............. A23L 1/237 426/583 |
| 6,541,050 B1 | 4/2003 | Bonorden et al. | |
| 2008/0085360 A1 | 4/2008 | Chigurupati | |
| 2009/0104330 A1 | 4/2009 | Zasypkin | |
| 2010/0303853 A1 | 12/2010 | Lejeune et al. | |
| 2011/0098365 A1 | 4/2011 | Minter et al. | |
| 2011/0229607 A1 | 9/2011 | Wang et al. | |
| 2012/0023763 A1 | 2/2012 | Ariyanayagam et al. | |

FOREIGN PATENT DOCUMENTS

| | | |
|---|---|---|
| EP | 0103994 A1 | 3/1984 |
| FR | 2973989 A1 | 10/2012 |
| KR | 100987630 B1 | 10/2010 |
| NL | 2008798 C | 11/2013 |
| WO | 9853708 A1 | 12/1998 |
| WO | 2005077206 A1 | 8/2005 |
| WO | 2007132123 A1 | 11/2007 |
| WO | 2009056737 A1 | 5/2009 |
| WO | 2009116050 A1 | 9/2009 |
| WO | 2010124905 A1 | 11/2010 |
| WO | 2011/070454 A1 | 6/2011 |

OTHER PUBLICATIONS

Dutch Search Report for NL2008798 dated Jan. 22, 2013.
International Search Report for PCT/EP2013/059792 dated Jun. 12, 2013.
International Preliminary Report on Patentability for PCT/EP2013/059792 dated Nov. 11, 2014.

* cited by examiner

*Primary Examiner* — Hamid R Badr
(74) *Attorney, Agent, or Firm* — Ramin Amirsehhi; David P. Owen; Philip Tsai

(57) ABSTRACT

The present invention relates to a salt replacement product comprising homogeneous particles of: (a) 5-70 wt % of one or more extracts from fungi, like from mycelia or mushrooms; (b) 10-80 wt % of a chloride salt of a metal that is acceptable in food, chosen from calcium, magnesium, or mixtures thereof; and (c) optionally one or more powder stabilizing additives. The invention furthermore relates to a process for making the product, and to use of the product for salt replacement in baked dough products.

6 Claims, No Drawings

SALT REPLACEMENT COMPOSITION, A PROCESS FOR MAKING A SALT REPLACEMENT COMPOSITION, AND ITS USE IN BAKED DOUGH PRODUCTS

The present invention relates to replacement compositions for common kitchen salt. Common kitchen salt (sodium chloride, also abbreviated as NaCl) is much in use. The average uptake per human being is between 7 and 11 g per day. However, the daily needed dosage is only about 1 g per day. The high salt, and in particular high sodium content of the food causes high blood pressure and other vascular problems in a substantial part of the population.

Most of the salt is present in readymade food. This includes soups, bread, and readymade dinners. Therefore, there is a need to lower the sodium concentration in many foodstuffs.

Several approaches are known to reduce the sodium content in foodstuffs, however, salt replacement is only implemented in specific fields.

One of the approaches is replacing sodium chloride with magnesium chloride, potassium chloride, calcium chloride or magnesium sulphate, or mixtures of such salts, as e.g. described in U.S. Pat. No. 6,541,050, 4,107,346 or US2010/303853. This replacement generally causes problems with taste, as the metals often cause an off-flavour, like for example a metallic taste (particularly known for potassium) or a bitter taste (particularly known for calcium). Although the content of ions is comparable in comparison with only sodium chloride, the taste of the other salts generally is not salty. Hence, in case the salty taste is relevant, this replacement often is not effective.

Another approach is changing the structure of the salt. For example multicrystalline salt particles on a hollow core give a stronger salty taste, while using less sodium chloride. This approach, for example described in US2008/085360 or US2011/098365 is however not suitable in dishes where salt is dissolved.

Yet another approach is the use of the so-called fifth taste, the umami taste. The umami taste is best known from the use of sodium glutamate, but can also be triggered by a number of other compounds generally obtained by natural ingredients, like yeast or mushrooms, or by fermentation like for example in soy sauce. Indeed, precisely for the umami taste, yeast extract is often used in soups, and in mushroom flavoured foodstuffs.

Bread is a foodstuffs for which it is difficult to lower the sodium chloride content. Generally, bread contains about 18 g/kg sodium chloride (between 15 and 23 g/kg). The sodium chloride not only influences the taste, but also the structure of the bread and the effect of leavening.

Replacing sodium chloride with other metal salts influences the taste in a negative way. The use of e.g. yeast extract influences the texture of the bread negatively and does not result in an salty enough taste. Also, the taste of the bread should remain neutral. Bread should not get a distinct umami or mushroom taste.

WO2011/070454 describes the use of deactivated yeast as a supplement to replace part of the sodium chloride. Simple bread required still more than 1.5% (more than 15 g/kg) salt. Furthermore, in practice, the bakers find an inacceptable change in taste and structure of the bread when using plain deactivated yeast to replace part of the sodium chloride. In some cases, acceptable results are obtained if a further taste enhancer is added. However, this has the disadvantage of adding further costs.

US2010/303853 describes the use of yeast extract in combination with potassium chloride and ammonium chloride. The use of potassium chloride and ammonium chloride still influences the taste in a negative way.

The present invention provides a novel composition for the partial replacement of sodium chloride, in particular for use in baked dough products, like bread. The novel composition can replace part of the sodium chloride in bread while not negatively influencing the taste, nor the structure of the bread.

SUMMARY OF THE INVENTION

The invention provides a composition for salt replacement, the product comprising substantial homogeneous particles of
  5-70 wt % of one or more extracts from fungi, like from mycelia or mushrooms,
  10-80 wt % of a chloride salt of a metal that is acceptable in food, chosen from calcium, magnesium, or mixtures thereof,
  and optionally one or more powder stabilizing additives The invention furthermore provides a method for the preparation of a salt replacement product, the method comprising the following steps:
  Providing a solution of
    5-70 wt % (on dry weight) of one or more extracts from fungi, like from mycelia or mushrooms,
    10-80 wt % of a chloride salt of a metal that is acceptable in food, chosen from calcium, magnesium, or mixtures thereof,
    and optionally one or more powder stabilizing additives
  drying the solution
  and obtaining a substantial homogeneous salt replacement product in granular form.

The invention furthermore provides baked dough products containing less than 1.3% sodium chloride, further comprising 0.2-3% salt replacement product of the invention.

The invention provides a single product, that can partly replace sodium chloride in baked dough products like bread and pizza, without changing the taste perception or the structure of the bread.

DETAILED DESCRIPTION OF THE INVENTION

The invention provides a composition for salt replacement, the product comprising substantially homogeneous particles of
  5-70 wt % of one or more extracts from fungi, like from mycelia or mushrooms,
  10-80 wt % of a chloride salt of a metal that is acceptable in food, chosen from calcium, magnesium, or mixtures thereof,
  and optionally one or more powder stabilizing additives.

The extracts from fungi can be extracts from mycelia or mushrooms. Extracts generally are hydrolyzed products obtained from e.g. yeasts, filamentous fungi, or from fruit bodies of fungi (mushrooms).

The extracts generally are solutions of cell components. Such solutions are obtained by hydrolyzation of fungi material. Hydrolyzation can be achieved with enzymatic treatment, heat treatment, chemical treatment and the like.

As yeast extracts normally available extracts can be used. Yeast extracts are known in the art. Yeast extracts can have a more or less neutral taste. Preferred yeast extracts are those with a more neutral taste.

Examples of yeast extracts include Maxarite® of DSM and of Springer® or Springarom® from Lesaffre Extracts from filamentous fungi include extracts from *aspargillus* species, or other filamentous fungi.

Extracts from fruit bodies of fungi (mushrooms), include those known in the art, such as *agaricus bisporus* and other *Agaricus* spp. like for example *Agaricus Bitorquis, Agaricus campestris, Agaricus blazei, Agaricus arvensis*. Yet further suitable mushrooms are oyster mushrooms (*Pleurotus ostreatus*), straw mushrooms (*Volvaria Volvcea*), and Enokitake (*Flammulina velutipes*).

Extracts from fruit bodies generally are prepared by cooking (remainders of) mushroom. Suitable remainders include for example the stems of the mushrooms. The mushrooms can be grinded before cooking. The solids can—at the appropriate time—be removed via (micro)filtration and/or centrifugation, and he cooking fluid is thickened by evaporation and/or reverse osmosis.

Another source of extract from fungi can be the blanching water, that is used to treat mushrooms. The blanching water can be thickened with reverse osmosis and/or evaporation. Preferably, the blanching water is subjected to microfiltration to remove particles.

The salt can be any chloride salt of a metal acceptable in food, wherein the metal is chosen from calcium, magnesium, and mixtures thereof. Suitable examples of salts include calcium chloride ($CaCl_2$) and magnesium chloride ($MgCl_2$).

Calcium chloride is preferred, in particular because it is a cheap material, which can be handled well in the process of making the substantial homogeneous particles. Furthermore, the sodium chloride and the extract of fungi masks any unpleasant taste of the calcium ions.

The salts are preferably food grade, but do not have to be of high purity. Hence, the salts may contain other metal ions.

The metal salts need to have a substantial amount of chloride. However, the salt may comprise other ions, like for example some sulphate.

The salt replacement product of the invention is in the form of substantially homogeneous particles. The particles may sometimes tend to be sticky, and/or to be hygroscopic. Therefore, it can be useful to have the particles stabilized with additives.

Suitable stabilizing additives include polymers or oligomers of carbohydrate nature like sacharides. Several of such polymers or oligomers are known. Suitable examples include maltodextrine, with a polymerisation grade of less than 30, more preferably less than 10. Suitable maltodextrines include DE6 maltodextrine, Maltrin M040, Maltrin M100 and Maltrin M150.

Other suitable stabilizing additives include dissolved silica. Dissolved silica preferably comprises siliconhydroxydes.

The salt replacement product contains 5-60 wt % extract from fungi, preferably the product contains more than 10 wt %, and even more preferably about 20 wt % or more extract (on dry basis). The amount preferably is 65 wt % or less, even more preferably about 60 wt % or less. Suitable amounts include about 25 wt %, about 30 wt % and about 40 wt %.

The salt replacement product contains 10-80 wt % of a chloride salt of the defined metal that is acceptable in food. The amount of chloride salt preferably is more than 20 wt %, and even more preferable about 30 wt % or more. Preferably, the amount of salt is preferably about 75 wt % or less. Suitable amounts include about 40 wt %, about 50 wt % and about 60 wt %.

The amount of fungi extract relative to chloride salt preferably is between about 1:1 to 1:3, and more preferable between about 1:1.3 to 1:2.5, and even more preferably about 1:1.7 to 1:2.3.

Preferably, the extract of fungi and the chloride salt together amount to about 70 wt % or more, preferably about 80 wt % or more, and even more preferred about 85 wt % or more of the salt replacement product. However, this relatively high amount is just for economic reasons. Hence, a suitable salt replacement product can be made with e.g. 10 wt % fungi-extract, 20 wt % calciumchloride and 70 wt % stabilizing filler components. With such a low-amount of active ingredients, more salt replacement product is needed to have the same effect.

The optional one or more particle stabilizing additive is preferably present in a relatively low amount, as this adds costs, and has (preferably) no influence on the taste. Preferably, the additive is present in an amount of about 40 wt % or less, more preferable about 20 wt % or less. If the additive is present, it generally is present in an amount of more than 1 wt %, preferably in an amount of about 3 wt % or more, more preferably about 6 wt % or more.

A suitable composition according the present invention contains about 25-35 wt % fungi extract, 50-70 wt % chloride salt and 5-25 wt % stabilizing additives. This composition contains a balanced amount of sufficient umami taste enhancer and chloride salt in a stable powder form to be an effective salt replacement product for baked dough product.

In one preferred embodiment of the invention, the fungi extract is an extract from yeast, and the chloride salt is calcium chloride.

In another preferred embodiment of the invention, the fungi extract is an extract from *agaricus bisporus* mushroom, and the chloride salt is calcium chloride.

These preferred embodiments are even more preferably combined with the preferred ranges described above for the amounts and ratios of components and additives.

The invention furthermore provides a method for the preparation of a salt replacement product, the method comprising the following steps:
  providing a solution of:
    5-70 wt % of one or more extracts from fungi, like from mycelia or mushrooms;
    10-80 wt % of a chloride salt of a metal that is acceptable in food, chosen from calcium, magnesium, or mixtures thereof;
    and optionally one or more powder stabilizing additives;
  drying the solution;
  and obtaining a substantial homogeneous salt replacement product in granular form.

The method according the invention preferably comprises spray drying a substantial homogeneous solution of the components described above.

The term "substantial homogeneous" with respect to the particles is to be understood that each particle may comprise (micro)domains of individual components, yet, each particle will comprise all the components in the mixture.

The term "solution" is to be understood that particles less than 1 micrometer, preferably less than 0.1 micrometer may be present. Hence, a stable emulsion or dispersion is considered a solution in the present invention.

The preferred method according the invention is spray drying. This process generally requires a liquid process stream with particles less than nanometer size, as otherwise the spray nozzles CaO become blocked. Hence, the solution for spray drying preferably does not comprise particles that cause blockage of the spray nozzles. In case a turbine is used to spray the particles, the sensitivity for small particles is less. Yet, it is preferred to use a solution.

The solution used in spray drying preferably has a solid content between about 25 wt %-35 wt %, although lower or higher solid content may be possible. However, a low solid content is energy intensive, as much water needs to be evaporated. A high solid content may cause a high viscosity, making spray drying less easy.

The extract of fungi generally is used as a solution of about 15-45 wt % solid, preferably 25-35 wt % solid.

The salt generally is used as a 10-50 wt % solid, preferably as a 25-35 wt % solution. It is possible to dissolve the salt in the solution of the fungi extract, this is generally not preferred, because of the high viscosity of that solution.

The particle stabilizing additive can equally be supplied as a 10-50 wt %, preferably 25-35 wt % solution, or the additives can be dissolved in the salt solution or the fungi extract solution. Dissolved silica may be supplied in more diluted form.

The preferred method uses solutions of the individual components, and mixes these as fluids because that simplifies mixing and leads to a reliable process. However, this preference is just for practical reasons.

Spray drying can be performed with parameters as usual in the art. For example, suitable parameters include spraying in a tower of 12 meter, with an inlet temperature of the air of higher than 130° C., but lower than 185° C. The viscosity of the liquid can be for example between 50 and 1000 mPa·s. Spraying may be through nozzles or via a turbine.

The dry particles can be further dried, and/or further cooled in a fluid bed dryer/cooler if needed. Food grade anti-caking agents like silicondioxide particles can be added if considered useful.

The resulting powdery salt replacement product may be sieved to remove large conglomerates and/or dust.

Preferred particles are preferably smaller than 1 mm, even more preferred smaller than about 0.5 mm (less than about 500 μm).

The particles will in general be larger than 5 μm, preferably larger than 10 μm, although some smaller particles may be present. The particles may have an average diameter of 50 to 200 μm, like for example about 100 or 130 μm.

Spray drying is a preferred method as the resulting particles will have good flow properties and a homogeneous texture. However, other drying methods CaO be used as well, such as for example drum drying or belt drying. Such drying methods will require a further milling step, and a more extensive sieving step. Also, more overly small particles are obtained, which may need to be recycled. Yet, the requirements for potential particles in the solution are less strict, as no nozzles can become blocked.

The invention furthermore provides baked dough products containing less than 1.3% sodium chloride, further comprising 0.2-3% salt replacement product of the invention.

The amount of salt replacement product will depend on its strength. E.g., a salt replacement product with only 10% carrier material can be used in an amount of 0.2 to 1.5%. If the amount of fungi-extract and chloride salt is only 30 wt %, 3 times more salt replacement product is needed. In general, the strength is preferably such, that about 3 wt % or less is needed to obtain an effective salt replacement.

The dough product generally comprises flour, water, leavening agent, salt and optionally bread improvers and/or other additives to achieve special types of bread, like buns.

The dough product preferably contains yeast as leavening agent.

The salt replacing product can in practice replace about 50 wt % to about 30 wt % of the sodium chloride salt normally used. Hence, the present invention is also related to the use of the salt replacing product for use in bread for lowering the amount of sodium chloride.

Baked dough products are well known, and include bread products, like white bread, brown bread, buns and pizza bread.

The invention will be elucidated by the following non limiting examples.

EXAMPLES

Example 1

Preparation of Spray Dried Salt Replacement Product

A solution was prepared by mixing the following ingredients:
1. A watery solution of 32% solids mushroom extract from *agaricus bisporus*
2. A watery solution of 36% solids CaCl2
3. A watery solution of 33% solids of a mixture of 10:1 maltodextrine and silicon hydroxides
1. 9 wt % maltodextrine
2. 1 wt % silica
3. 60 wt % calciumchloride
4. 30 wt % mushroom powder The powder was prepared by spray drying in a tower of 12 m. The inlet temperature of the liquid was 95° C. The drying air had an inlet temperature of about 160° C. The liquid was sprayed over a turbine.

The particles were screened to exclude larger conglomerates, and had a size of less than 500 μm. The flow properties were good.

Example 2

Preparation of Bread

Bread dough with 1.8% (18 g per kg dry weight) common kitchen salt was used as standard comparison. The same dough was prepared with 10 g NaCl and the following further salt replacement:
1. 15 g umami dried mushroom powder
2. 15 g spray dried combination of umami dried mushroom powder and CaCl2
3. 15 g CaCl2

The resulting baked breads showed the following characteristics:
1. Unsatisfactory; tasted as low-salt bread, and no optimal structure of the bread
2. very good, comparable in taste to standard bread
3. Slightly bitter/sour taste; not enough salt taste

The invention claimed is:
1. A dough product which comprises flour, water, leavening agent, containing less than 1.3% sodium chloride, further comprising 0.2-3% salt replacement product comprising a homogeneous particle of:
   a. 5-70 wt. % of one or more extracts from fungi;
   b. 10-80 wt. % of a chloride salt of a metal that is acceptable in food, selected from the group consisting of calcium, magnesium, or combinations thereof.

2. The dough product according to claim 1, wherein the leavening agent is yeast.

3. A baked dough product, containing less than 1.3% sodium chloride, further comprising 0.2-3% salt replacement product comprising a homogeneous particle of:
   a. 5-70 wt. % of one or more extracts from fungi;
   b. 10-80 wt. % of a chloride salt of a metal that is acceptable in food, selected from the group consisting of calcium, magnesium, or combinations thereof.

4. The dough product of claim 3, wherein the extract from fungi is yeast extract.

5. The dough product of claim 3, wherein the extract from fungi is extract from *agaricus bisporus* mushroom.

6. The dough product of claim 3, wherein the chloride salt is calcium chloride.

* * * * *